United States Patent [19]
Jacobs et al.

[11] Patent Number: 6,002,241
[45] Date of Patent: Dec. 14, 1999

[54] DUAL MODE SPLIT-BOOST CONVERTER AND METHOD OF OPERATION THEREOF

[75] Inventors: Mark E. Jacobs, Dallas; Yimin Jiang; Hengchun Mao, both of Plano, all of Tex.

[73] Assignee: Lucent Technologies Inc., Murray Hill, N.J.

[21] Appl. No.: 09/183,076

[22] Filed: Oct. 30, 1998

[51] Int. Cl.$^6$ .................................................. G05F 1/613
[52] U.S. Cl. ............................................. 323/225; 307/44
[58] Field of Search ...................... 307/44, 45; 363/61; 323/222, 225

[56] References Cited

U.S. PATENT DOCUMENTS 5,701,096  12/1997  Higashiho ................................ 327/536

OTHER PUBLICATIONS

"A New Control Scheme for Buck+Boost Power Factor Correction Circuit" by Y. Jiang and F. C. Lee; 1993; pp. 189–193.

"Three–Level Boost Converter for and its Application in Single–Phase Power Factor Correction" by Y. Jiang and F. C. Lee; 1994; pp. 127–133.

"An Improved High–Efficiency Rectifier for Telecom Applications" by M. E. Jacobs, R. W. Farrington, G. H. Fasullo, Y. Jiang, R. J. Murphy, V. J. Thottuvelil, K. J. Timm: 1996; pp. 530–535.

"Analysis and Design of a Wide Input Range Power Factor Correction Circuit for Three–Phase Applications" by Ray Ridley, Siegfried Kern and Berthold Fuld; 1993; pp. 299–305.

*Primary Examiner*—Shawn Riley

[57] ABSTRACT

A split-boost converter having a main inductor, first and second main switches and floating and fixed outputs and a method of operating the same. In one embodiment, the converter includes an auxiliary diode coupled between the main inductor and a first rail of the floating output, and an auxiliary switch coupled to a node between the main inductor and the auxiliary diode and a second rail of the floating output. The converter is operable in a first mode, when an input voltage of the converter at least equals an output voltage of the converter, in which the auxiliary switch remains open and the first and second main switches are modulated to operate the converter. The converter is further operable in a second mode, when an input voltage of the converter is less than an output voltage of the converter, in which the first and second main switches remain closed and the auxiliary switch is modulated to operate the converter.

20 Claims, 2 Drawing Sheets

DUAL MODE SPLIT-BOOST CONVERTER AND METHOD OF OPERATION THEREOF

TECHNICAL FIELD OF THE INVENTION

The present invention is directed, in general, to power conversion and, more specifically, to a split-boost converter that adapts its switching to different ranges of input voltage and a method of operating the same.

BACKGROUND OF THE INVENTION

Boost converters have been widely used in various power conversion applications employing both three-phase and single-phase AC input voltages. The conventional single-switch boost converter has become the most popular topology for single-phase power factor correction. For an RMS AC input voltage in the range of 85 volts to 265 volts, a boost technology can provide a sinusoidal input current and an output DC voltage near 400 volts. However, if the RMS AC input voltage is greater than approximately 265 volts, the DC output voltage for a conventional boost converter has to be increased.

As the DC output voltage increases, the voltage stress on the switching devices in both the boost converter and the following load converter increases. This condition requires higher blocking voltage switching devices. The cost of the higher blocking voltage switching devices is greater than the lower voltage rated switching devices. Additionally, the higher voltage rated devices exhibit higher forward conduction voltage drops and higher switching losses than the lower voltage rated devices, which makes them more energy-dissipative, and therefore less efficient.

An approach for dealing with this situation is to adopt the buck+boost topology, which allows the DC output voltage to be lower than the instantaneous AC input voltage. The DC output voltage may then be maintained at 400 volts or less even though the peak AC voltage is greater. There are several disadvantages to the buck+boost converter, however. First, a large pulsating input current requires a large electromagnetic interference (EMI) filter to counteract its negative effects. Also, the buck switch is subjected to both high voltage and high current stresses. Finally, a large number of silicon devices are typically required to process the power.

For three-phase rectification, the split-boost converter is a very efficient topology that allows the DC output voltage to be less than the peak AC input voltage. The split-boost converter provides two equal output voltages and requires two separate loads. A basic requirement of this topology is that the instantaneous rectified AC input voltage must be in a range that is greater than the individual DC output voltages but less than twice the individual DC output voltages for the converter to function properly. As a result, the conventional split-boost topology may not be used in single-phase, high power factor AC input voltage applications.

Accordingly, what is needed in the art is a way to employ the split-boost topology for AC input voltages that are less than the individual DC output voltage.

SUMMARY OF THE INVENTION

To address the above-discussed deficiencies of the prior art, the present invention provides a split-boost converter having a main inductor, first and second main switches and floating and fixed outputs and a method of operating the same. In one embodiment, the converter includes: (1) an auxiliary diode coupled between the main inductor and a first rail of the floating output and (2) an auxiliary switch coupled to a node between the main inductor and the auxiliary diode and a second rail of the floating output, the converter operable in: (2a) a first mode, realized when an input voltage of the converter at least equals an output voltage of (either output of) the converter, in which the auxiliary switch remains open and the first and second main switches are modulated to operate the converter and (2b) a second mode, realized when an input voltage of the converter is less than an output voltage of the converter, in which the first and second main switches remain closed and the auxiliary switch is modulated to operate the converter.

Those skilled in the pertinent art understand that a split-boost converter has a common node and two outputs: one referenced to the common node and one not referenced to the common node. For purposes of the present invention, the output referenced to the common node is defined as the "Fixed" output and the output not referenced to the common node is defined as the "floating" output.

The present invention therefore provides a split-boost converter that adapts its operation based on the relationship between its input and output voltages. In particular, the converter shifts to a mode in which the auxiliary switch operates the converter when the input voltage is less than the output voltage. This allows the converter to operate with a single phase rectifier in which the input voltage provided by the rectifier regularly drops below the output voltage.

In one embodiment of the present invention, the converter further includes a first capacitor coupled across the first and second rails of the floating output. In a related embodiment, the converter further includes a second capacitor coupled across the first and second rails of the fixed input.

In one embodiment of the present invention, the converter further includes a single-phase rectifier coupled to the main inductor. Of course, the converter may receive its input voltage from a three-phase rectifier or DC source. If the input voltage drops below the output voltage, the converter still changes from the first to the second mode of operation.

In one embodiment of the present invention, the converter further includes a main diode coupled between the second rail of the floating output and a first rail of the fixed output. Those skilled in the art are familiar with the operation of such main diodes.

In one embodiment of the present invention, the first mode is realized when the input voltage at least equals the output voltage of the converter and at most equals twice the output voltage. This is the case in an embodiment to be illustrated and described.

In one embodiment of the present invention, the output voltage is between about 350 volts and about 400 volts DC. In a more specific embodiment, the output voltage is 400 volts DC.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
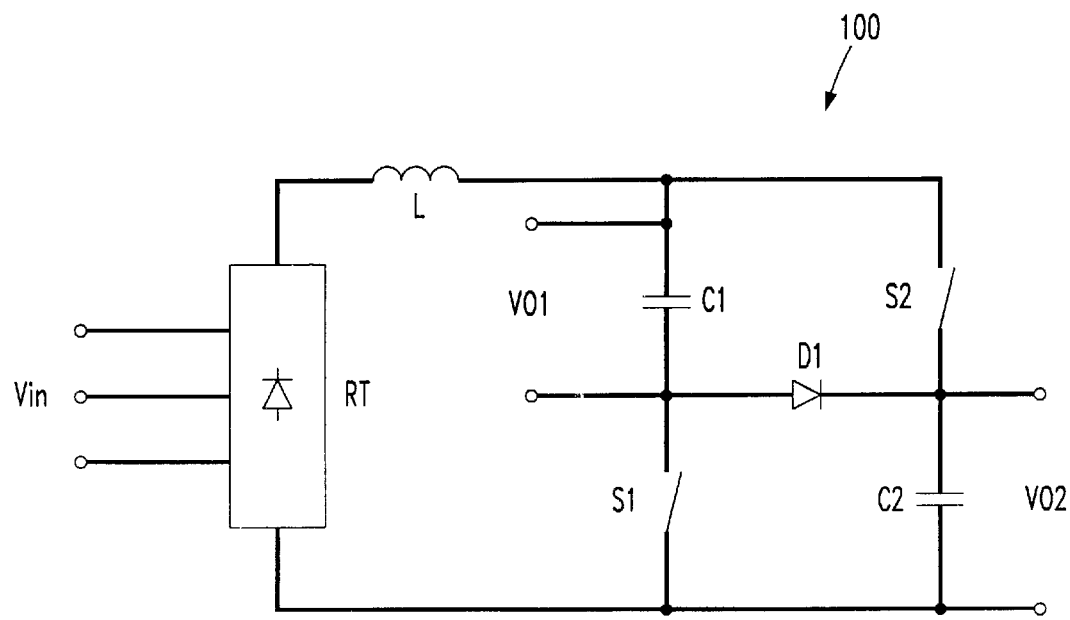
FIG. 1 illustrates a prior art split-boost converter.

Referring initially to FIG. 1, illustrated is a prior art split-boost converter, generally designated 100. The split-boost converter 100 includes an input rectifier RT having a three phase input voltage Vin, a main inductor L, a main diode D1, first and second main switches S1, S2 and first and second output capacitors C1, C2, providing first and second output load voltages V01, V02 respectively. The first and second output load voltages V01, V02 are substantially equal in value and require two separate loads.

The first and second main switches S1, S2 are controlled in tandem to open and close at the same time. When both the first and second main switches S1, S2 are closed, a voltage difference between the input voltage Vin and a value equal to one of the first or second load voltages V01, V02 is applied to the main inductor L causing the main inductor L's current (the combined load current) to increase. Alternately, when both the first and second main switches S1, S2 are open, a voltage difference between the sum of the first and second load voltages V01, V02 and the smaller input voltage Vin causes the current in the main inductor L to decrease. The first and second output capacitors C1, C2 provide filtering for the first and second output load voltages V01, V02 respectively.

The input rectifier RT provides a three phase rectified signal to the main inductor L. A basic requirement for proper operation of the split-boost topology is that the rectified input voltage presented to the main inductor L has a value that is between one and two times the first or second output load voltage Vo1, Vo2. This condition is easily met with a three phase rectified input voltage, since the controlling input voltage phase is always greater than half of the peak voltage value (assuming all three phases are present). However, for a single phase input voltage this cannot be achieved, since the rectified input voltage decreases to a zero value every half cycle.

Figure 2:
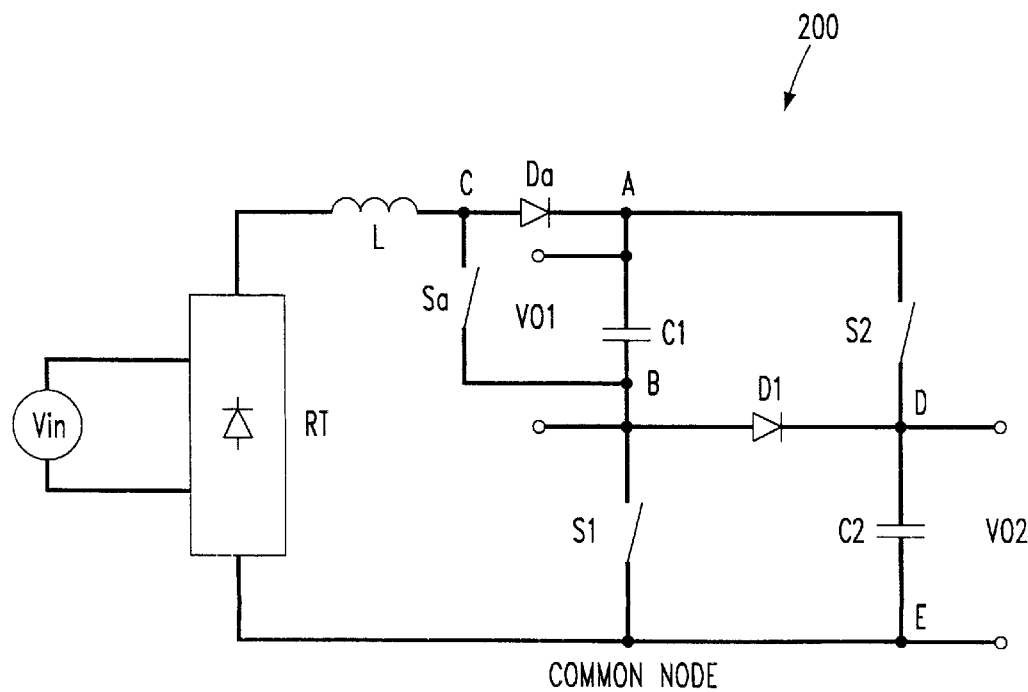
FIG. 2 illustrates a split-boost converter constructed according to the principles of the present invention.

Turning now to FIG. 2, illustrated is a split-boost converter 200 constructed according to the principles of the present invention. The split-boost converter 200 includes an input rectifier RT having a single phase input voltage Vin, a main inductor L, a main diode D1, first and second main switches S1, S2 and first and second capacitors C1, C2 which filter a floating output with an output voltage V01 and a fixed output with an output voltage V02 respectively. The split-boost converter 200 further includes an auxiliary switch Sa and an auxiliary diode Da. The floating and fixed output voltages V01, V02 are equal in value and require two separate loads. The floating and fixed output voltages V01, V02 of each of the floating and fixed outputs is typically between about 350 volts and about 400 volts DC. In the illustrated embodiment, the output voltage is 400 volts DC.

The split-boost converter 200 includes the single-phase rectifier RT coupled to the main inductor L. Of course, the split-boost converter 200 may receive its input voltage Vin from a three-phase rectifier arrangement, which would allow the operation of the split-boost converter 200 to change from a first mode of operation to a second mode if the input voltage Vin drops below one of the floating and fixed output voltages V01, V02. In the illustrated embodiment of the present invention, the first mode is realized when the input voltage Vin at least equals one of the floating or fixed output voltage V01, V02 of the split-boost converter 200 and at most equals twice the floating and fixed output voltage V01, V02. A second mode is realized when the input voltage Vin is less than one of the floating or fixed output voltage V01, V02.

The split-boost converter 200 includes the first capacitor C1 coupled across first and second rails A, B of the floating output and the second capacitor C2 coupled across first and second rails D, E of the fixed output. The split-boost converter 200 further includes a main diode D1 coupled between the second rail B of the floating output and the first rail D of the fixed output. Those skilled in the art are familiar with the operation of such main diodes in a split-boost topology.

The present invention therefore illustrates the split-boost converter 200 as having the main inductor L and the first and second main switches S1, S2 with floating and fixed outputs. As discussed earlier, the split-boost converter 200 has a common node and two outputs. The fixed output is referenced to the common node and the floating output is not referenced to the common node. In the illustrated embodiment, the split-boost converter 200 Includes the auxiliary diode Da coupled between the main inductor L and the first rail A of the floating output. The auxiliary switch Sa is coupled to the node C between the main inductor L and the auxiliary diode Da and the second rail B of the floating output.

The split-boost converter 200 operates in one of the two modes discussed earlier. The first mode is realized when the input voltage Vin of the split-boost converter 200 at least equals a floating or fixed output voltage V01, V02 in which the auxiliary switch Sa remains open and the first and second main switches S1, S2 are modulated to operate the split boost converter 200. This is the same mode of operation described in the split-boost converter 100 of FIG. 1. The second mode is realized when the input voltage Vin of the split-boost converter 200 is less than the floating or fixed output voltage V01, V02 in which the first and second main switches S1, S2 remain closed, thereby placing the two output loads essentially in parallel, and the auxiliary switch Sa is modulated to operate the split-boost converter 200 in conjunction with the auxiliary diode Da. This mode of operation is equivalent to a single-switch boost converter with the two outputs in parallel, thereby allowing a lower output voltage than a conventional boost converter would require.

The present invention therefore provides a split-boost converter that adapts its operation based on the relationship between its input and output voltages. In particular, the split-boost converter 200 shifts to a mode in which the auxiliary switch Sa operates the split-boost converter 200 when the input voltage Vin is less than the floating or fixed output voltage V01, V02. This allows the split-boost converter 200 to operate with a single phase rectifier in which the voltage provided by the rectifier RT regularly drops below the floating or fixed output voltage V01, V02.

Advantages of the illustrated embodiment include operating the split-boost converter 200 in a continuous current mode (CCM), which is an advantageous feature of a conventional boost converter as compared to a buck+boost mode of operation. The output voltage in the illustrated embodiment may be lower than the peak input voltage, which is not possible with a conventional boost converter. Also, all of the switching devices are rated with respect to the floating or fixed output voltage V01, V02, which may be half that of a conventional boost converter. Additionally, the volt-second requirement of the main inductor L is smaller than that of a conventional boost converter, allowing a lower value of inductance to be used effectively.

Figure 3:
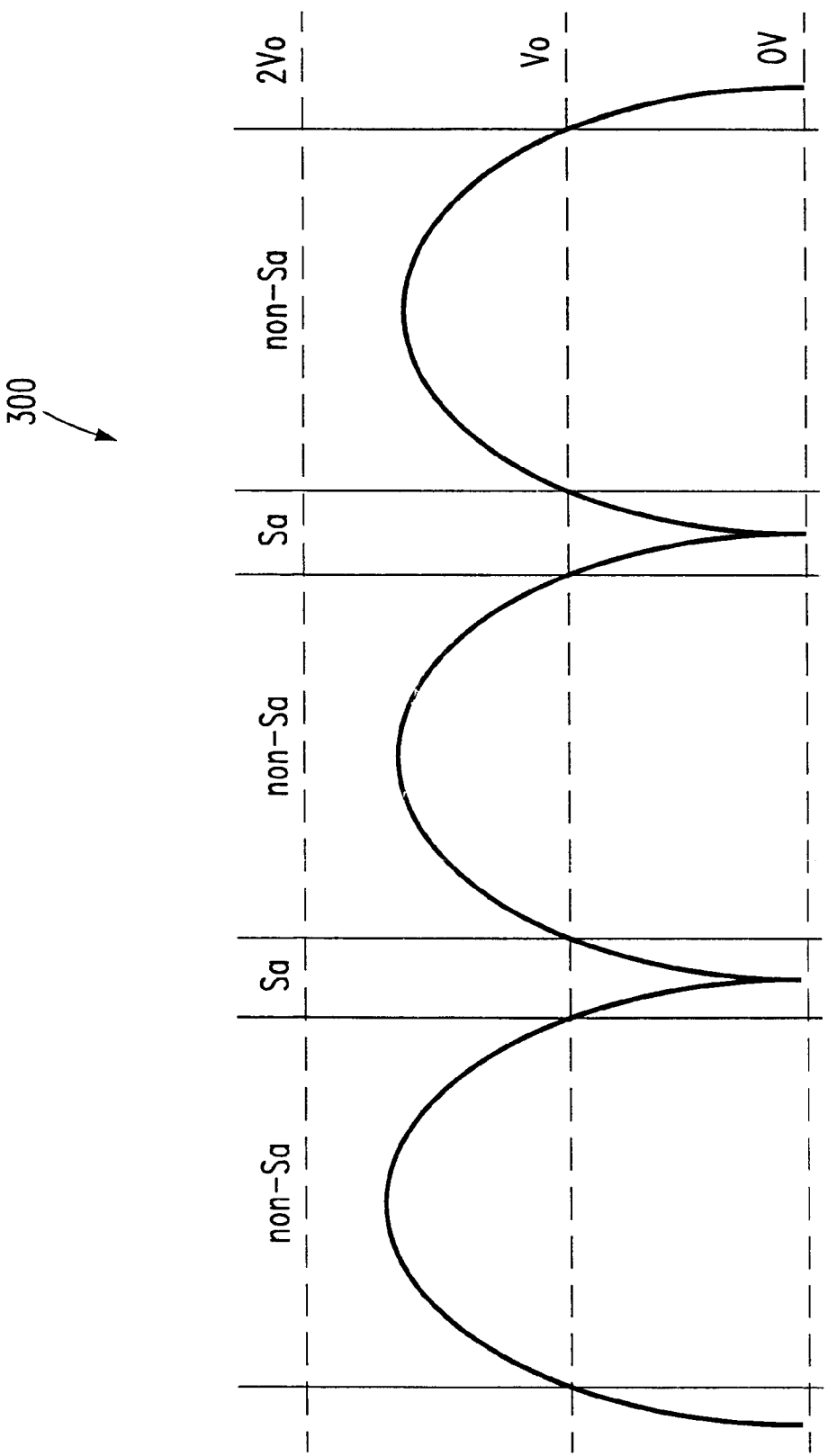
FIG. 3 illustrates a diagram showing an input voltage waveform setting forth the conditions under which the first and second modes of the converter of FIG. 2 are selected.

Turning now to FIG. 3, illustrated is a diagram showing an input voltage waveform 300 setting forth the conditions under which the first and second modes of the split-boost converter 200 of FIG. 2 are selected. The input voltage waveform 300 shows a repetitive cycle which occurs at the output of the rectifier RT shown in FIG. 2. The voltage Vo is the value of the floating or fixed output voltage V01, V02 for the split-boost converter 200 and provides a threshold for switching between the first mode and second mode of operation discussed in FIG. 2.

When the input voltage waveform 300 is at least equal to the voltage Vo, The first mode of operation (non-Sa) is realized where the auxiliary switch Sa is always open and the first and second main switches S1, S2 are controlling the operation of the split-boost converter 200. When the input voltage Vin is less than the voltage Vo, the second mode of operation (Sa) is realized in which the first and second main switches S1, S2 are always closed and the auxiliary switch Sa is controlling the operation of the split-boost converter 200.

For a better understanding of conversion technologies and split-boost converters, see: (1) Y. Jiang and F. C. Lee, "Three Level Boost Converter for Application in Single-Phase Power Factor Correction", VPEC Power Electronics Seminar Proceedings, Sep. 11, 1994, pp. 127–133., (2) M. E. Jacobs, et al., "An Improved High Efficiency Rectifier for Telecom Applications", Proceedings of INTELEC 1996, pp. 530–535., (3) Y. Jiang and F. C. Lee, "A New Control Scheme for Buck+Boost Power Factor Control Circuit", VPEC Power Electronics Seminar Proceedings, Sep. 19, 1993, pp. 189–193 and (4) R. Ridley, et al., "Analysis and Design of a Wide Input Range Power Factor Correction Circuit for Three-Phase Applications", Proceedings of APEC, Mar. 7, 1993, pp. 299–305. The aforementioned references are incorporated herein by reference.

From the above, it is apparent that the present invention provides a split-boost converter having a main inductor, first and second main switches and floating and fixed outputs and a method of operating the same. In one embodiment, the converter includes: (1) an auxiliary diode coupled between the main inductor and a first rail of the floating output and (2) an auxiliary switch coupled to a node between the main inductor and the auxiliary diode and a second rail of the floating output, the converter operable in: (2a) a first mode, realized when an input voltage of the converter at least equals an output voltage of (either output of) the converter, in which the auxiliary switch remains open and the first and second main switches are modulated to operate the converter and (2b) a second mode, realized when an input voltage of the converter is less than an output voltage of the converter, in which the first and second main switches remain closed and the auxiliary switch is modulated to operate the converter.

Although the present invention has been described in detail, those skilled in the art should understand that they can make various changes, substitutions and alterations herein without departing from the spirit and scope of the invention in its broadest form.

What is claimed is:

1. A split-boost converter having a main inductor, first and second main switches, floating and fixed outputs and comprising:

an auxiliary diode coupled between said main inductor and a first rail of said floating output; and an auxiliary switch coupled to a node between said main inductor and said auxiliary diode and a second rail of said floating output, said converter operable in:

a first mode, realized when an input voltage of said converter at least equals an output voltage of said converter, in which said auxiliary switch remains open and said first and second main switches are modulated to operate said converter, and a second mode, realized when an input voltage of said converter is less than an output voltage of said converter, in which said first and second main switches remain closed and said auxiliary switch is modulated to operate said converter.

2. The converter as recited in claim 1 further comprising a first capacitor coupled across said first and second rails.

3. The converter as recited in claim 1 further comprising a second capacitor coupled across first and second rails of said fixed input.

4. The converter as recited in claim 1 further comprising a single-phase rectifier coupled to said main inductor.

5. The converter as recited in claim 1 further comprising a main diode coupled between said second rail and a first rail of said fixed output.

6. The converter as recited in claim 1 wherein said first mode is realized when said input voltage at least equals said output voltage of said converter and at most equals twice said output voltage.

7. The converter as recited in claim 1 wherein said output voltage is between about 350 volts and about 400 volts DC.

8. A method of operating a split-boost converter having a main inductor, first and second main switches and floating and fixed outputs, comprising:

connecting an auxiliary diode coupled between said main inductor and a first rail of said floating output;

operating said converter in a first mode, when an input voltage of said converter at least equals an output voltage of said converter, in which an auxiliary switch coupled to a node between said main inductor and said auxiliary diode and a second rail of said floating output remains open and said first and second main switches are modulated to operate said converter; and operating said converter in a second mode, when an input voltage of said converter is less than an output voltage of said converter, in which said first and second main switches remain closed and said auxiliary switch is modulated to operate said converter.

9. The method as recited in claim 8 further comprising charging a first capacitor coupled across said first and second rails.

10. The method as recited in claim 8 further comprising charging a second capacitor coupled across first and second rails of said fixed input.

11. The method as recited in claim 8 further comprising providing said input voltage with a single-phase rectifier coupled to said main inductor.

12. The method as recited in claim 8 further comprising forward-biasing a main diode coupled between said second rail and a first rail of said fixed output.

13. The method as recited in claim 8 wherein said first mode is realized when said input voltage at least equals said output voltage of said converter and at most equals twice said output voltage.

14. The method as recited in claim 8 wherein said output voltage is between about 350 volts and about 400 volts DC.

15. A split-boost converter, comprising:

a main inductor;

first and second main switches coupled to said main inductor;

floating and fixed outputs to said first and second main switches and having respective first and second rails;

first and second capacitors coupled across said first and second rails of said floating and fixed outputs, respectively;

an auxiliary diode coupled between said main inductor and said first rail of said floating output; and an auxiliary switch coupled to a node between said main inductor and said auxiliary diode and said second rail of said floating output, said converter operable in:

a first mode, realized when an input voltage of said converter at least equals an output voltage of said converter, in which said auxiliary switch remains open and said first and second main switches are modulated to operate said converter, and a second mode, realized when an input voltage of said converter is less than an output voltage of said converter, in which said first and second main switches remain closed and said auxiliary switch is modulated to operate said converter.

16. The converter as recited in claim 15 further comprising a single-phase rectifier coupled to said main inductor.

17. The converter as recited in claim 15 further comprising a main diode coupled between said second rail and a first rail of said fixed output.

18. The converter as recited in claim 15 wherein said first mode is realized when said input voltage at least equals said output voltage of said converter and at most equals twice said output voltage.

19. The converter as recited in claim 15 wherein said output voltage is between about 350 volts and about 400 volts DC.

20. The converter as recited in claim 15 wherein said output voltage is about 400 volts DC.

* * * * *